UNITED STATES PATENT OFFICE.

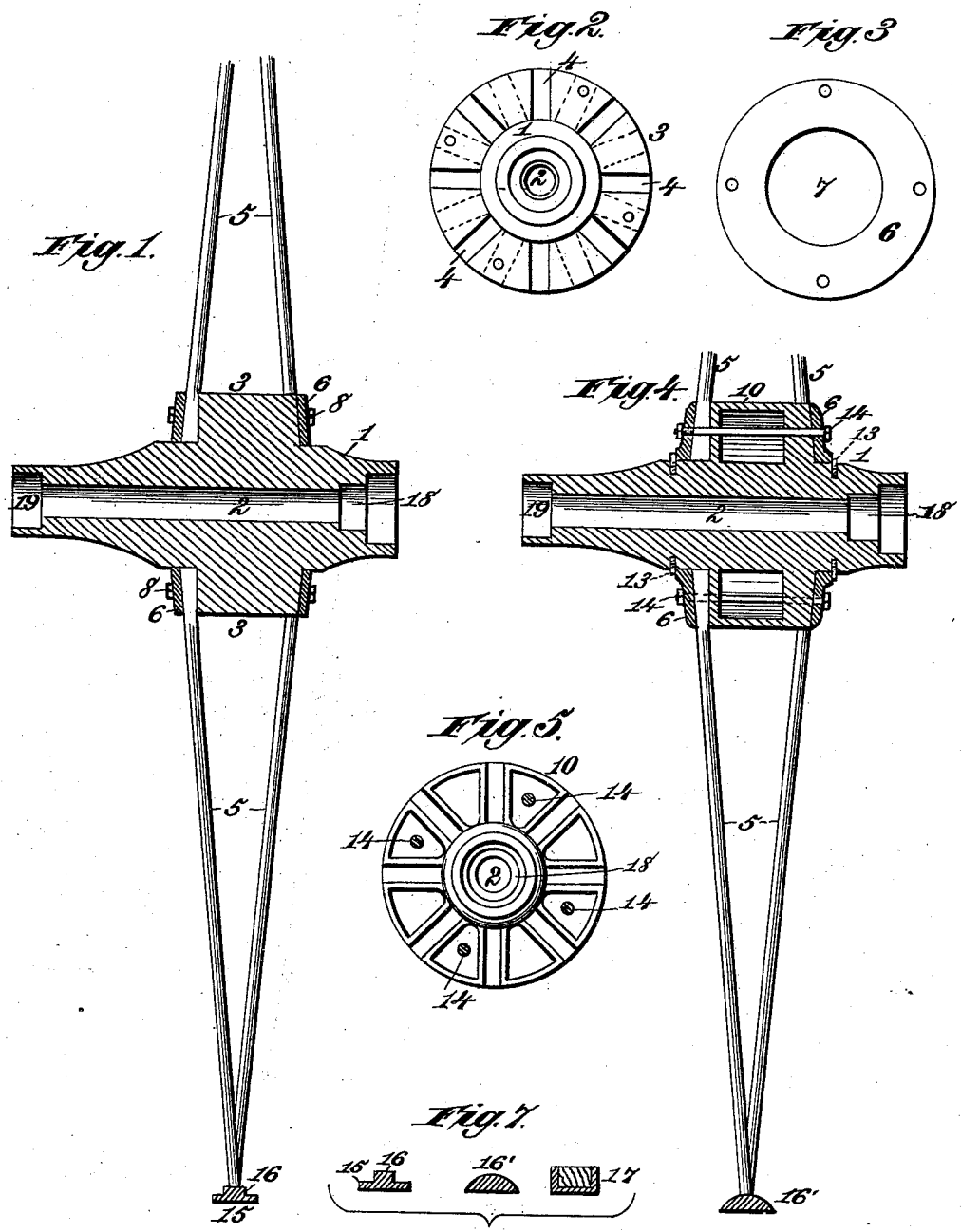

ALVAN B. EWING, OF LEWISBURG, TENNESSEE.

WHEEL.

SPECIFICATION forming part of Letters Patent No. 357,120, dated February 1, 1887.

Application filed February 19, 1886. Serial No. 192,562. (Model.)

*To all whom it may concern:*

Be it known that I, ALVAN B. EWING, a citizen of the United States, residing at Lewisburg, in the county of Marshall and State of Tennessee, have invented new and useful Improvements in Wheels for Vehicles, of which the following is a specification.

My invention relates to certain improvements in wheels for wagons and other vehicles, and the purpose thereof is to provide a strong, durable, and comparatively cheap wheel, composed entirely of metal and adapted for wagons and other vehicles carrying light or heavy loads.

The invention consists of the several novel features of construction and combinations of parts, hereinafter fully described, and definitely pointed out in the claims annexed to this specification.

In the accompanying drawings, Figure 1 is a section of the wheel taken in the axial line of the hub. Fig. 2 is a front elevation of the central portion of the wheel, the hub-cap and spokes being removed. Fig. 3 is a view of the hub-cap detached. Fig. 4 is a central section of the wheel in the axial line of the hub, showing a modified construction. Fig. 5 is a view of the face of the hub used upon the wheel shown in Fig. 4. Fig. 6 is a perspective view of the form of spokes used upon this wheel. Fig. 7 is a sectional view of the several forms of tire used upon the wheel.

In the said drawings the reference-numeral 1 designates the hub or central portion of the wheel, containing an opening, 2, for the spindle, and provided with an external collar, 3. Upon each of the vertical faces of the collar 3 are formed, at regular intervals, recesses 4, which radiate from the axial line of the opening 2 and are alternated with each other upon the opposite faces. These grooves are of proper size and shape to receive the butts of the spokes 5 and allow their outer faces to lie flush with the surfaces of the collar. The inner ends of the recesses are also cut deeper into the collar than the outer ends, the peculiar form of the butts of the spokes being such as to require this construction, by which the spokes are dovetailed into the hub.

Upon the hub, and sitting against the faces of the collar and against the spokes set therein, are placed caps 6, consisting of metallic disks having openings 7, which receive the ends of the hub or box 1. These caps are fastened to the collar by bolts 8, passing through them into the collar 3, whereby the butts of the spokes are most securely fastened and firmly held.

In place of the solid collar shown in Fig. 1, I may use the construction shown in Fig. 4, wherein the collar is made in the form of a hollow shell. Upon its external faces this hollow collar is provided with radial grooves, in which the butts of the spokes may be set in the manner already described, the grooves being alternated at the opposite faces of the collar, as in Fig. 1. Cast or formed integral with the collar is a ring, 10, extending from one vertical face of the hollow collar to the other, notches being formed in its edges to receive the spokes when the latter are placed in the grooves formed in the outer faces of the collar. This ring or band 10 gives great firmness and strength to the parts, without materially increasing their weight. The external faces of the collar converge slightly from their inner toward their outer edges to give such convergence of the alternating spokes that they will at their points lie in a plane passing centrally between the outer faces of said collar. This angle of convergence may be varied to suit wheels of different sizes.

The hub and caps may be formed of cast-iron or steel; but the latter is preferable, as having much greater strength with the same weight of metal. The spokes and tire may be of either metal.

In order to support the caps more perfectly, short bolts 13 may be set in the hub or box 1, just outside the inner edges of the caps, to prevent them from giving back by the pressure of the spokes. Said caps are also secured, as in Fig. 4, by through-bolts 14, engaging with the collar between the spokes.

The tire 15 (shown in Fig. 7) may have a skein, 16, on its inner surface, about half the width (more or less) of the tire itself; or it may be formed, as at 16', plano-convex in cross-section. Finally, I may roll the tire into the form shown in cross-section at 17, which gives the greatest strength with the same amount of metal. If this form is used, a strip of wood must be fitted within the tire to support its parallel sides and keep it from filling with dirt. If, however, there are more spokes used, the tire may be made correspondingly lighter, as it is then supported at short intervals.

It will be understood that the length and size of the spokes may be varied in different wheels used for different purposes, and the dimensions of the other parts may also be varied in any suitable manner.

In the butt-end of the box 1, I form an opening, 18, for the collar on the axle, and at the point is formed a space, 19, for the nut on the axle. These take the place of the usual butt and point bands and are integral with the hub.

Wheels for various purposes will be made of standard sizes and their parts manufactured in duplicate, so that if a part breaks it may be supplied and inserted without delay and at small cost. The metal may be painted; but I prefer to galvanize it. The spokes may be made of wrought-iron, if desired, and are provided with tenons which penetrate the tire and are headed upon the outside.

If desired, a light wire may be placed upon the wheel and secured to the spokes, a heavier tire being mounted upon the thin tire. By this construction the outer tire, when worn thin, may be removed and a new one set in its place without affecting the spokes or hub.

Heretofore a vehicle-wheel has been composed of a hub cast with an annular collar having its opposite sides radially grooved and provided with reduced screw-threaded ends receiving a screw-threaded point and mud-bands by which the spokes are held in the grooves. Such, however, does not constitute my invention, and is not claimed by me. A metal wheel has also been composed of spokes dovetailed into one side of a flange on the hub, the spokes being held by a ring bolted to the flange; but such I do not claim. Neither do I claim a wheel-hub having a central rim with grooved collars on each side, in which the inner ends of the spokes are set, nor a hub having a collar provided with socketed converging faces and bands or caps for securing the spokes, as such is not my invention. In my wheel the hub is formed with an integral central collar having converging faces provided with radial oppositely-alternating grooves for receiving the inner ends of the staggered spokes, which are held in place within said collar and flush with its converging faces by means of flat ungrooved annular bands or caps 6 and transverse bolts passing through said collar and caps, thus securing great strength and durability with lightness and compactness of structure.

What I claim is—

1. An all-metal wheel, as herein described, composed of a hub having an integral collar formed with converging faces provided with radial oppositely-alternating grooves 4, increasing in depth toward their inner ends, staggered spokes having tapered butts of greatest depth at their inner ends and fitting in said grooves, with their inclined outer faces flush with the adjacent inclined faces of the collar, the outer ends of said spokes being formed with tenons, annular caps lying against the outer faces of said collar and spokes, both passed through said collar and caps, and a tire engaging the tenons on the outer ends of the spokes, substantially as described.

2. In an all-metal wheel, the combination, with a hub having an integral collar provided on its outer or opposite faces with radial alternating grooves to receive the spokes, of caps resting against the outer faces of the grooved collar, and short bolts 13 set in the hub and bearing against the outside of the said caps, substantially as described.

In testimony whereof I affix my signature in presence of two witnesses.

ALVAN B. EWING.

Witnesses:
 HENRY K. MOSS,
 J. A. YARBROUGH.